Patented Sept. 24, 1946

2,408,167

UNITED STATES PATENT OFFICE 2,408,167

CATALYTIC ALKYLATION PROCESS

Harold J. Hepp, Bartlesville, Okla., assignor to Phillips Petroleum Company, a corporation of Delaware No Drawing. Application October 14, 1944, Serial No. 558,734

13 Claims. (Cl. 260—671)

This invention relates to alkylation processes. In one of its more important embodiments the invention relates to the alkylation of aromatic compounds by reaction with olefins in the presence of solid catalytic materials. In a specific embodiment this invention relates to an improved process for the production of monoalkyl derivatives of aromatic hydrocarbons by reaction with low-boiling olefin hydrocarbons having two to about six carbon atoms per molecule.

It is well known to alkylate aromatic compounds such as the more common aromatic hydrocarbons, phenols, acids, and the like by reaction with various alkylating reactants such as olefins, alkyl halides, alcohols, and the like in the presence of catalysts such as the well-known Friedel-Crafts catalysts, sulfuric acid, phosphoric acid, hydrofluoric acid, and in some instances also with solid granular materials such as clays. Some of these catalysts are extremely corrosive and also often quite expensive, particularly when high catalyst losses result from undesired side reactions. Various clay-type catalysts avoid these difficulties, but are not nearly as active in promoting the alkylation reaction so that as a result it is necessary to use relatively high reaction temperatures with them. All of these materials are capable of promoting olefin polymerization and have required careful regulation of reaction conditions to maintain alkylation as the predominant reaction. Even with suitable precautions it is not uncommon to obtain poor yields, high catalyst consumption and non-selective alkylation.

I have now found that aromatic compounds can be reacted with olefin hydrocarbons to form high yields of monoalkyl derivatives by using as a catalyst solid adsorbent materials synthetically produced and comprising a high proportion of silica and a small proportion of an oxide of a metal of group IIIB or of group IVA of the periodic system. In general these catalysts are prepared by first forming an acidic gel or jelly by reacting an alkali metal silicate with an excess of an acid as by passing alkali silicate solution into an excess of aqueous mineral acid, and allowing the reaction mixture to set to a gel, washing soluble material from the gel, treating or activating the gel with an aqueous solution of a suitable metal salt and subsequently washing and drying the treated material. Activation may preferably be accomplished by contacting the gel with an aqueous solution of the hydrolyzable salt at temperatures approximating the boiling point of the solution. In this manner, a part of the metal, presumably in the form of a hydrous oxide or loose hydroxide compound formed by hydrolysis is selectively adsorbed by the hydrous silica, and is not removed by subsequent washing. A preferred catalyst of this type, at present, is a silica-alumina catalyst, prepared by treating a wet or partially dried hydrous silica gel with an aluminum salt solution and subsequently washing and drying the treated material. However, catalysts of a very similar nature, but differing among themselves as to one or more specific properties, may be prepared by using, instead of an aluminum salt, a hydrolyzable salt of a metal selected from group IIIB or from group IVA of the periodic system and may be referred to in general as "silica-alumina type" catalysts. As listed in "Modern Inorganic Chemistry" by J. W. Mellor (Longmans, Green & Co. (1939) revised and edited by G. D. Parkes) on page 118 group IIIB consists of boron, aluminum, gallium, indium and thallium, and group IVA consists of titanium, zirconium, hafnium and thorium. More particularly, salts of indium and thallium in addition to aluminum in group IIIB may be used, and salts of titanium, zirconium and thorium in group IVA may be used to treat silica gel and to prepare catalysts of this general type. Boron in the form of boric acid, or a soluble borate such as sodium borate, may also be incorporated with silica gel. Whether prepared by this method or by some modification thereof, the catalyst will contain a major portion as silica, and a minor portion of metal oxide. The minor portion of metal oxide, such as alumina, will generally not be in excess of 10 per cent by weight, and will more often, and generally more preferably, be between about 0.1 and 1.5 or 2 per cent by weight.

In the above-outlined procedure, the starting materials are usually chosen from the water-soluble silicates and the commercially available mineral acids. Sulfuric and hydrochloric acids are preferred on economic grounds, although any acid may be used which will provide suitable hydrogen ion concentration and form a silica hydrogel of proper consistency. Thus, phosphoric, acetic, nitric, and boric acids may be used in certain instances. The gel formed should be acidic and should be partially dried and washed free of excess acid prior to activation, and the extent of drying is carefully controlled since the eventual catalyst activity is apparently somewhat dependent on the maintenance of the hydrous oxide composition prior to the activation treatment. The salt solution for activation may be prepared from any water-soluble hydrolyzable salt of one or more of the metals indicated, with the sulfate or chloride being preferred. Other alternative salts include acetates and nitrates. The adsorption of the hydrous oxide by the silica gel proceeds smoothly with hydrated silica gel, whereas with dried silica the adsorption and the activation may be much less satisfactory. Active catalysts are preferably rinsed free of the salt solution and a moderate concentration effect or "curing" may be obtained by partial drying of the rinsed gel. The final washing then serves to remove unadsorbed salts and free acid, and the final drying which is performed at moderate temperatures produces hard, brittle granules of gel containing negligible quantities of compounds other than silica and the metal oxide.

The final drying should not be conducted at too high a temperature, and generally a temperature no higher than the initial reaction temperature in the subsequent alkylation reaction will be found to be quite satisfactory. The catalytic material can be used in simple equipment as a bed or mass of granules of any suitable size which will generally be found to be between about 4 and about 20 mesh. However, if desired a catalyst may be ground to a fine powder and incorporated as a part of the flowing reacting stream employing any of the known so-called powdered catalyst techniques which are used in the petroleum industry for cracking and reforming hydrocarbons.

I have found that the activity of this specific catalytic material is markedly enhanced by incorporating in the reaction mixture a small amount of hydrogen chloride. Often amounts as small as 0.01 per cent of the reactants will be sufficient to give adequate results, and in any event it will generally not be necessary to employ more than about 1 per cent of the reactants by weight of hydrogen chloride. Preferably the reaction mixture is maintained substantially free from moisture. If desired the hydrogen chloride can be introduced in combined form as an alkyl chloride, but even with this modification the amount of alkyl chloride which is added need not exceed that amount which is equivalent to the small amount of hydrogen chloride just mentioned. Hydrogen halides other than hydrogen chloride are relatively inferior when attempts are made to substitute them for hydrogen chloride in the present process. Hydrogen fluoride attacks and adversely affects the solid catalytic material while hydrogen bromide and hydrogen iodide tend to undergo undesirable decomposition reactions. The catalysts which I use in my invention have been previously proposed for use as olefin polymerization catalysts and it has also been found that hydrogen halides and alkyl halides act as promoters for the polymerization of olefin hydrocarbons by these catalysts. This fact, however, is believed to emphasize an unexpected characteristic of the present invention since it is believed that a promoter which is known to increase the activity of such solid catalysts for olefin polymerization reactions would adversely affect such an alkylation reaction rather than promote the production of greater amounts of monoalkyl derivatives of the aromatic compounds, since such a promoter would tend to increase the amount of olefins going to polymers.

In a preferred embodiment, my process operates as follow: Hydrogen chloride in an amount ranging from a trace up to a maximum of about 1.0 per cent by weight is added to the charge, which comprises a major proportion of the compound to be alkylated, for example, benzene, and a minor proportion of olefin. The olefin used may be a single olefin or a mixture of olefins; the mole ratio of benzene to olefin in the charge may range from 2:1 to 100:1, but preferably should be in the range of about 5:1 to 10:1. Inert hydrocarbons may or may not be present in the charge.

The charge is heated to the necessary reaction temperature and is passed through a bed of granular silica-alumina catalyst under sufficient pressure to maintain liquid phase. The optimum temperature depends on the nature of the particular reactants, the activity of the catalyst, the quantity of hydrogen chloride present, the contact time, etc., and should be determined for each individual case. Ordinarily, however, the preferred temperature will be in the range of 400 to 600° F., although it may in some cases be as low as 350° F. or as high as 700° F.

The contact time in the catalyst bed may vary from 1 to 100 minutes, depending on the various conditions. Usually it will be desirable to adjust conditions so that the desired extent of conversion is obtained with a contact time of about 5 to 10 minutes. Since the activity of the catalyst gradually decreases with continued use, it is necessary gradually to increase the temperature, the contact time and/or the hydrogen chloride content of the feed in order to maintain the desired per-pass conversion. The presence of hydrogen chloride materially increases the life of the catalyst.

After passing through the catalyst bed the hydrocarbon stream goes to a system of fractionators wherein it is separated into various fractions including unreacted olefin (if any), unreacted benzene, alkylate fraction or fractions, and residue. The unreacted benzene and olefin may be used to make up fresh hydrocarbon charge.

Obviously, many modifications may be introduced in this process. For example, a portion of the effluent from the catalyst bed may be recirculated with the fresh feed, thus decreasing the olefin concentration in the feed to the catalyst bed; the catalyst bed may consist of a series of portions of silica-alumina of progressively increasing activity; portionwise addition of olefin at points along the bed may be practiced; etc. The hydrogen chloride may be conveniently added to the charge in the form of an alkyl chloride instead of the free hydrogen chloride itself, as previously mentioned. This is especially applicable when the alkyl chloride is the same as would be produced by the reaction of hydrogen chloride with the olefin being used in the alkylation.

The following data illustrate advantages to be gained from the practice of my invention.

In a series of runs, mixtures of benzene, propylene, isobutylene, isobutane, and a small amount of octenes, with and without approximately 0.1 per cent by weight of HCl, were passed continuously at temperatures ranging from 400 to 700° F. and at pressures of 1000 to 1700 p. s. i. through a bed of 14-40 mesh dehydrated silica-alumina catalyst. The effluent mixture from the catalyst bed in each case was collected and subsequently examined. The data pertaining to these experiments are presented in the following table:

It will be appreciated that the teachings of this disclosure may be followed and applied by one skilled in the art in connection with the practice of numerous specific applications and modifications of my invention. Therefore the invention

|  | With HCl (0.1%) | | | Without HCl | | | |
|---|---|---|---|---|---|---|---|
|  | Run 1 | Run 2 | Run 3 | Run 4 | Run 5 | Run 6 | Run 7 |
| Pressure, psig | 1,000 | 1,100 | 1,100 | 1,000 | 1,500 | 1,500 | 1,700 |
| Temp., °F. (avg.) | 482 | 504 | 502 | 410 | 518 | 541 | 702 |
| Flow rate, vol./vol. catalyst/hr.: | | | | | | | |
| Fresh feed | 4.3 | 11.6 | 11.1 | 8.6 | 4.7 | 5.5 | 7.7 |
| Recirculation | 30.0 | 0.0 | 30.0 | 0.0 | 30.0 | 30.0 | 0.0 |
| Contact time, min | 14.0 | 5.2 | 5.4 | 7.0 | 12.8 | 10.9 | 7.8 |
| Composition of fresh feed, wt. per cent: | | | | | | | |
| Propylene | 2.7 | 3.0 | 2.8 | 2.6 | 4.5 | 4.0 | 3.4 |
| Isobutylene | 3.6 | 3.3 | 3.2 | 2.7 | 9.2 | 5.8 | 4.9 |
| Isobutane | 26.0 | 25.1 | 25.0 | 30.4 | 37.8 | 26.0 | 27.8 |
| Benzene | 66.4 | 67.3 | 67.7 | 64.3 | 48.5 | 63.5 | 63.9 |
| Octenes | 1.3 | 1.3 | 1.3 | 0.0 | 0.0 | 0.7 | 0.0 |
| Total | 100.0 | 100.0 | 100.0 | 100.0 | 100.0 | 100.0 | 100.0 |
| Benzene/olefin mol ratio in fresh feed | 6.4 | 6.6 | 7.0 | 7.5 | 2.3 | 4.1 | 4.9 |
| Alkylate¹ yield, wt. per cent in effluent | 14.4 | 14.0 | 13.6 | 7.1 | 14.3 | 14.8 | 14.9 |
| Alkylate¹ yield, wt. per cent of reacted olefin | 248 | 233 | 248 | 182 | 110 | 163 | 185 |
| Alkylate¹ composition, wt. per cent: | | | | | | | |
| Lighter than cumene (194-293° F.) | 3.2 | 1.9 | 4.9 | 15.0 | 5.2 | 10.3 | 3.1 |
| Cumene cut (293-318° F.) | 32.2 | 40.3 | 42.6 | 48.0 | 31.8 | 40.4 | 41.6 |
| Tert. butyl benzene cut (318-356° F.) | 37.4 | 28.7 | 27.7 | 21.0 | 29.5 | 25.6 | 30.5 |
| Residue (>356° F.) | 27.2 | 29.1 | 24.8 | 16.0 | 33.5 | 23.7 | 24.8 |
| Total | 100.0 | 100.0 | 100.0 | 100.0 | 100.0 | 100.0 | 100.0 |
| Conversions, wt. per cent: | | | | | | | |
| Propylene converted | 92 | 92 | 91 | 69 | 88 | 86 | 96 |
| Isobutylene converted | 94 | 92 | 92 | 78 | 95 | 90 | 97 |
| Reacted C₃H₆ to cumene | 64 | 68 | 75 | 62 | 30 | 51 | 65 |
| Reacted i-C₄H₈ to t-butylbenzene | 66 | 51 | 51 | 24 | 17 | 28 | 39 |
| Inspection of light alkylate (combined cumene-t-butylbenzene fractions): | | | | | | | |
| Unsaturates content, wt. per cent | 2.6 | 4.9 | 5.5 | 18 | 12 | 11 | 2.0 |
| Antiknock blending values 3-C (+4 ml. TEL, Rich) IMEP | | ²477 | | | ³363 | | |

¹ Free of benzene and lighter materials.
² Tested in a blend containing 5% of light alkylate composited from several runs.
³ Tested in a blend containing 10% of light alkylate composited from several runs.

The data in this table show that the presence of HCl substantially reduces the temperature at which conversion is effected. Thus, in runs 1, 2, and 3, wherein HCl was present, more than 90 per cent of the total olefin was converted at approximately 500° F.; whereas in runs 4, 5, 6, and 7 temperatures approaching 700° F. were necessary to produce high total-olefin conversion in the absence of HCl. Furthermore, the percentage of converted propylene and isobutylene reacting to form cumene and tertiary butyl benzene fractions, respectively, is considerably higher, and the olefin content of these fractions is lower, in the absence of HCl. The relatively higher yield of tertiary butylbenzene fractions in runs 1, 2 and 3 shows that the alkylation reaction is favored by the presence of HCl even when the olefins are especially easily polymerized, such as isobutylene. Thus, the presence of HCl greatly favors the simple addition reaction between benzene and olefin and is accordingly an important advantageous factor in the synthesis of specific compounds from specific reactants.

The antiknock data show that the 3-C (+4.0 ml. TEL, Rich) blending value of the composite light alkylate produced in the presence of HCl is over 30 per cent higher than that produced in the absence of such a promoter. The data show further that the yield of light alkylate based on olefin converted was 40 to 100 per cent higher when HCl was present. These are very important factors in the manufacture of aviation gasoline components.

My process offers the additional advantages, due to the lower reaction temperature, that less expensive equipment is required in commercial operation and that the catalyst life is increased by the reduced rate of deposition of carbonaceous material.

is not to be unduly limited by the specific details discussed in this disclosure and various specific modifications can be practiced without departing from the spirit of the disclosure or from the scope of the claims.

I claim:

1. An improved process for the reaction of benzene with propylene to form isopropyl benzene, which comprises passing a hydrocarbon mixture comprising propylene and a molar excess of benzene together with not more than about 1 per cent by weight of the reactants of hydrogen chloride through a bed of a solid granular catalyst at a reaction temperature not greater than about 600° F. and at a reaction pressure to promote union of said propylene and benzene to form isopropyl benzene; said granular catalyst comprising silica and not more than about 2 per cent by weight of alumina and prepared by passing an aqueous alkali silicate into an excess of an aqueous mineral acid and allowing the mixture to set to a silicic acid gel, washing said gel with water and only partially drying same to form a hydrous acidic silica gel, contacting said silica gel with an aqueous solution of a hydrolyzable aluminum salt at a temperature approximating the boiling point of said solution to activate said gel, washing said activated gel with water to remove free acid and salts, and finally drying said activated and washed gel to form hard granules.

2. An improved process for the production of an alkyl benzene from a low-boiling olefin and benzene, which comprises passing a hydrocarbon mixture comprising a low-boiling olefin and a molar excess of benzene together with not more than about 1 per cent by weight of the reactants of hydrogen chloride through a bed of a solid granular catalyst at a reaction temperature not greater than about 700° F. and a superatmospheric pressure to promote union of said olefin and benzene to form a corresponding alkyl benzene, said granular catalyst comprising silica and not more than about 2 per cent by weight of alumina and prepared by passing an aqueous alkali silicate into an excess of an aqueous mineral acid and allowing the mixture to set to a silicic acid gel, washing said gel with water and only partially drying same to form a hydrous acidic silica gel, contacting said silica gel with an aqueous solution of a hydrolyzable aluminum salt at a temperature approximating the boiling point of said solution to activate said gel, washing said activated gel with water to remove free acid and salts, and finally drying said activated and washed gel to form hard granules.

3. An improved process for the production of a monoalkyl derivative of an alkylatable aromatic hydrocarbon, which comprises passing a hydrocarbon mixture comprising an olefin hydrocarbon of not more than 6 carbon atoms per molecule and a molar excess of an alkylatable aromatic hydrocarbon together with not more than about 1 per cent by weight of the reactants of hydrogen chloride through a bed of a solid granular catalyst under conditions of temperature and pressure such as to promote union of said olefin and said aromatic hydrocarbon to form a corresponding monoalkyl derivative thereof, said granular catalyst comprising silica and not more than about 2 per cent by weight of alumina and prepared by passing an aqueous alkali silicate into an excess of an aqueous mineral acid and allowing the mixture to set to a silicic acid gel, washing said gel with water and only partially drying same to form a hydrous acidic silica gel, contacting said silica gel with an aqueous solution of a hydrolyzable aluminum salt at a temperature approximating the boiling point of said solution to activate said gel, washing said activated gel with water to remove free acid and salts, and finally drying said activated and washed gel to form hard granules.

4. The process of claim 3 in which said mineral acid is sulfuric acid and in which said aluminum salt is aluminum sulfate.

5. An improved process for the production of a monoalkyl benzene from a low-boiling olefin and benzene, which comprises passing a hydrocarbon mixture comprising a low-boiling olefin and a molar excess of benzene together with not more than about 1 per cent by weight of the reactants of hydrogen chloride through a bed of a solid granular catalyst under conditions of temperature and pressure such as to promote union of said low-boiling olefin and benzene to form a corresponding alkyl benzene, said granular catalyst comprising silica and a minor amount of alumina and prepared by reacting an alkali silicate with an excess of a mineral acid to form a silicic acid gel, washing said gel with water and only partially drying same to form a hydrous acidic silica gel, contacting the resulting silica gel with an aqueous solution of aluminum sulfate to activate same by adsorption of hydrous aluminum oxide thereon, and subsequently washing and drying the resultant activated material to form said granular catalyst.

6. An improved process for the production of a monoalkyl benzene from a low-boiling olefin and benzene, which comprises passing a hydrocarbon mixture comprising a low-boiling olefin and a molar excess of benzene together with not more than about 1 per cent by weight of the reactants of hydrogen chloride through a bed of a solid granular catalyst under conditions of temperature and pressure such as to promote union of said low-boiling olefin and benzene to form a corresponding alkyl benzene, said granular catalyst comprising silica and a minor amount of alumina and prepared by reacting an alkali silicate with an excess of a mineral acid to form a silicic acid gel, washing said gel with water and only partially drying same to form a hydrous acidic silica gel, contacting the resulting silica gel with an aqueous solution of a hydrolyzable aluminum salt to activate same by adsorption of hydrous aluminum oxide thereon, and subsequently washing and drying the resultant activated material to form said granular catalyst.

7. An improved process for the production of a monoalkyl derivative of an alkylatable aromatic hydrocarbon, which comprises passing a hydrocarbon mixture comprising an olefin hydrocarbon of not more than 6 carbon atoms per molecule and a molar excess of an alkylatable aromatic hydrocarbon together with not more than about 1 per cent by weight of the reactants of hydrogen chloride through a bed of a solid granular catalyst under conditions of temperature and pressure such as to promote union of said olefin and said aromatic hydrocarbon to form a corresponding monoalkyl derivative thereof, said granular catalyst comprising silica and a minor amount of an oxide of a metal selected from groups IIIB and IVA of the periodic system and prepared by reacting an alkali silicate with an excess of a mineral acid to form a silicic acid gel, washing said gel with water and only partially drying same to form a hydrous acidic silica gel, contacting the resulting silica gel with an aqueous solution of a hydrolyzable salt of a metal selected from groups IIIB and IVA of the periodic system to activate same by adsorption of a hydrous oxide of said metal thereon, and subsequently washing and drying the resultant activated material to form said granular catalyst.

8. An improved process for the production of a monoalkyl derivative of an alkylatable aromatic hydrocarbon, which comprises passing a hydrocarbon mixture comprising an olefin hydrocarbon of not more than 6 carbon atoms per molecule and a molar excess of an alkylatable aromatic hydrocarbon together with not more than about 1 per cent by weight of the reactants of hydrogen chloride through a bed of a solid granular catalyst under conditions of temperature and pressure such as to promote union of said olefin and said aromatic hydrocarbon to form a corresponding monoalkyl derivative thereof, said granular catalyst comprising silica and a minor amount of an oxide of a metal selected from group IIIB of the periodic system and prepared by reacting an alkali silicate with an excess of a mineral acid to form a silicic acid gel, washing said gel with water and only partially drying same to form a hydrous acidic silica gel, contacting the resulting silica gel with an aqueous solution of a hydrolyzable salt of a metal selected from group IIIB of the periodic system to activate same by adsorption of a hydrous oxide of said metal thereon, and subsequently washing and drying the resultant activated material to form said granular catalyst.

9. An improved process for the production of a monoalkyl derivative of an alklatable aromatic hydrocarbon, which comprises passing a hydrocarbon mixture comprising an olefin hydrocarbon of not more than 6 carbon atoms per molecule and a molar excess of an alkylatable aromatic hydrocarbon together with not more than about 1 per cent by weight of the reactants of hydrogen chloride through a bed of a solid granular catalyst under conditions of temperature and pressure such as to promote union of said olefin and said aromatic hydrocarbon to form a corresponding monoalkyl derivative thereof, said granular catalyst comprising silica and a minor amount of an oxide of a metal selected from group IVA of the periodic system and prepared by reacting an alkali silicate with an excess of a mineral acid to form a silicic acid gel, washing said gel with water and only partially drying same to form a hydrous acidic silica gel, contacting the resulting silica gel with an aqueous solution of a hydrolyzable salt of a metal selected from group IVA of the periodic system to activate same by adsorption of a hydrous oxide of said metal thereon, and subsequently washing and drying the resultant activated material to form said granular catalyst.

10. The process of claim 7 in which isopropyl benzene is produced from propylene and benzene.

11. The process of claim 7 in which a butyl benzene is produced from a butylene and benzene.

12. An improved process for the reaction of benzene with isobutylene to form tertiary butyl benzene, which comprises passing a hydrocarbon mixture comprising isobutylene and a molar excess of benzene together with not more than about 1 per cent by weight of the reacants of hydrogen chloride through a bed of a solid granular catalyst at a reaction temperature not greater than about 600° F. and at a reaction pressure to promote union of said isobutylene and benzene to form tertiary butyl benzene, said granular catalyst comprising silica and not more than about 2 per cent by weight of alumina and prepared by passing an aqueous alkali silicate into an excess of an aqueous mineral acid and allowing the mixture to set to a silicic acid gel, washing said gel with water and only partially drying same to form a hydrous acidic silica gel, contacting said silica gel with an aqueous solution of a hydrolyzable aluminum salt at a temperature approximating the boiling point of said solution to activate said gel, washing said activated gel with water to remove free acid and salts, and finally drying said activated and washed gel to form hard granules.

13. An improved process for the alkylation of an alkylatable organic compound by reaction with an olefin hydrocarbon, which comprises passing a reaction mixture comprising an olefin hydrocarbon and a molar excess of an alkylatable organic compound together with not more than about 1 per cent by weight of the reacants of hydrogen chloride into contact with a solid catalytic material under conditions of temperature and pressure such as to promote union of said olefin and said alkylatable aromatic compound to form a corresponding monoalkyl derivative thereof, said solid catalytic material comprising silica and a minor amount of an oxide of a metal selected from groups IIIB and IVA of the periodic system and prepared by reacting an alkali silicate with an excess of a mineral acid to form a silicic acid gel, washing said gel with water and only partially drying same to form a hydrou acidic silica gel, contacting the resulting silica gel with a aqueous solution of a hydrolyzable salt of a metal selected from groups IIIB and IVA of the periodic system to activate same by adsorption of a hydrous oxide of said metal thereon, and subsequently washing and drying the resultant activated material to form said granular catalyst.

HAROLD J. HEPP.